UNITED STATES PATENT OFFICE.

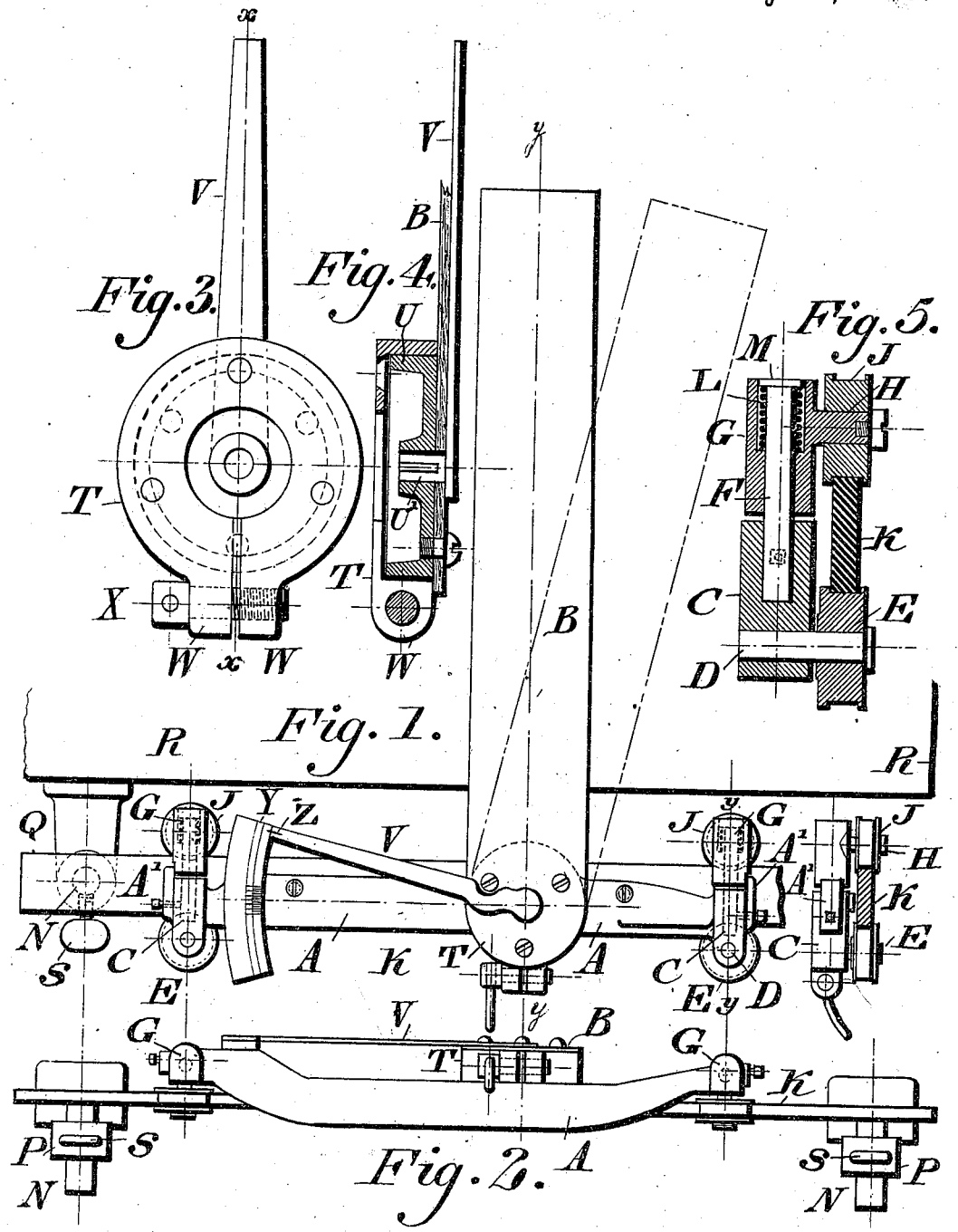

JOSEPH W. BRAMWELL, OF CAMDEN, NEW JERSEY.

T-SQUARE.

SPECIFICATION forming part of Letters Patent No. 502,112, dated July 25, 1893.

Application filed January 14, 1893. Serial No. 458,350. (No model.)

*To all whom it may concern:*

Be it known that I, JOSEPH W. BRAMWELL, a citizen of the United States, residing in the city and county of Camden, State of New Jersey, have invented a new and useful Improvement in T-Squares, which improvement is fully set forth in the following specification and accompanying drawings.

My invention consists in so mounting the main limb of a T-square that it may be adjusted in angular positions, and furthermore adjusted to the right or left according to requirements.

Figure 1 represents a face view of a T-square embodying my invention. Fig. 2 represents a front elevation thereof. Fig. 3 represents a rear view of the axial portion of the limb of the square on an enlarged scale. Fig. 4 represents a section on line $x, x$, Fig. 3. Fig. 5 represents a section of a portion on line $y, y$, Fig. 1, on an enlarged scale.

Similar letters of reference indicate corresponding parts in the several figures.

Referring to the drawings: A designates a traveler on which is mounted the limb B of a T-square, and whose ends have connected with them the blocks C, to which are secured the axles or shafts D of the grooved rollers E. Secured to said blocks C are bolts F, which extend at a right angle to the shafts D, and pass loosely through blocks G, which latter carry the shafts H of the grooved pulleys J, it being noticed that said pulleys or rollers E and H are on opposite edges of the bar K, and movable thereon for setting the limb B to the right or left as the case may be. A portion of the blocks G are recessed to receive the springs L, which bear against the bases of said recesses, and the heads M of the bolts F, so that when the blocks G are drawn out they pass freely over the bolts and heads thereof, and compress the springs L so that when the opposite rollers or pulleys are separated, said springs serve to force said rollers in contact with the bar K, and thus create a pressure which retains the traveler in adjusted position. The bar K is connected with the rods N, which are fitted in the eyes P, the latter being formed with or secured to the brackets Q, which are adapted to be attached to the edge of the drawing board R, said eyes P having screws S passing through the same, so as to tighten against the rods N, so that said rods N may be raised or lowered. In the eyes P provision is made for the vertical adjustment of the bar K, and consequently of the limb B, the screws S serving to hold the parts in their adjusted position.

Secured to the traveler A is a split sleeve T, which embraces the collar U, with which latter is connected the limb B and index finger V, and through which passes tightly the pin U' of the index finger. The ends of the split sleeve T are formed with eyes W in which is fitted a screw X, whereby said eyes may be brought together or separated for purposes of clamping the collar U, or being released of the same.

Secured to the traveler A at the end of the index finger V is a graduated segment Y. On the end of the index finger V adjacent to the segment Y is a mark Z, which is adapted to register with either of the graduations of the segment Y. When the screw X is loosened the limb B and collar U and index finger V by virtue of the friction of its pin U' in the collar U, rotate in sleeve T. The mark Z on the index finger V passes by graduations on the segment Y and indicates the angle of the limb B desired. The screw X is properly turned, whereby the collar U is clamped by the sleeve T. If a greater angle than the graduated segment Y indicates is desired, the index finger V is moved back to starting point from the other extreme of the graduated segment Y, the limb B and collar U remaining clamped by the sleeve T. The screw X is again loosened and the limb B and collar U and index finger V rotate in the sleeve T until said desired angle is determined, the screw X being again properly turned and the collar U is clamped by the sleeve T.

On the sides of the blocks C are guides A', which project from the same to such extent as to freely overlap the corresponding sides of the blocks G, whereby said blocks are guided in their motions to and from the blocks C. It will also be seen that the rollers J may be moved so that their flanges clear the edge of the bar K, so as to permit the removal of the traveler and all of its connected parts from said bar.

Having thus described my invention, what

I claim as new, and desire to secure by Letters Patent, is—

1. A T-square having a traveler with blocks at its ends provided with rollers, a bar on which said rollers are guided, and a limb secured to said traveler, said parts being combined substantially as described.

2. A T-square having a bar, means for adjustably connecting said bar with a support, a traveler movable on said bar, a limb having a collar secured thereto, and a split sleeve connected with the traveler and clamping the said collar, said parts being combined substantially as described.

3. A T-square having a bar, means for adjustably connecting said bar with a drawing board, a traveler having blocks with rollers journaled thereon and guided on said bar, said blocks having yielding connections, and a limb pivotally connected with said traveler, said parts being combined substantially as described.

4. In a T-square, a rotating collar carrying the limb of said square, a split sleeve encircling said collar, and a support for said sleeve, in combination with an index finger connected with said limb at the axis thereof, and a graduating segment or scale connected with said support for operation with said index finger, substantially as described.

5. In a T-square, a split sleeve, a collar therein and an index finger having a pin which is fitted in said collar, the parts named being combined substantially as described.

JOSEPH W. BRAMWELL.

Witnesses:
JOHN A. WIEDERSHEIM,
A. P. JENNINGS.